(12) United States Patent
Grams et al.

(10) Patent No.: US 8,954,842 B2
(45) Date of Patent: Feb. 10, 2015

(54) BALANCING MULTIPLE COLUMN LAYOUT

(75) Inventors: Jason James Grams, Broomfield, CO (US); Todd Michael Plummer, Estes Park, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 421 days.

(21) Appl. No.: 12/895,612

(22) Filed: Sep. 30, 2010

(65) Prior Publication Data

US 2012/0084642 A1 Apr. 5, 2012

(51) Int. Cl.
*G06F 17/00* (2006.01)
*G06F 17/24* (2006.01)

(52) U.S. Cl.
CPC .................................... *G06F 17/247* (2013.01)
USPC ............ 715/243; 715/246; 715/247; 715/253

(58) Field of Classification Search
CPC ..................................................... G06F 17/245
USPC .......................................................... 715/243
See application file for complete search history.

(56) References Cited

U.S. PATENT DOCUMENTS

| 4,575,813 | A | * | 3/1986 | Bartlett et al. | 715/217 |
| 4,608,664 | A | * | 8/1986 | Bartlett et al. | 358/1.2 |
| 4,891,771 | A | * | 1/1990 | Edel et al. | 715/217 |
| 5,808,914 | A | * | 9/1998 | Shin et al. | 703/2 |
| 6,389,437 | B2 | * | 5/2002 | Stoub | 715/201 |
| 7,472,340 | B2 | * | 12/2008 | Burago et al. | 715/227 |
| 2003/0107594 | A1 | * | 6/2003 | Bennett et al. | 345/760 |
| 2003/0158969 | A1 | * | 8/2003 | Gimson et al. | 709/246 |

* cited by examiner

*Primary Examiner* — Laurie Ries
*Assistant Examiner* — Zaida I Marrero
(74) *Attorney, Agent, or Firm* — Osha Liang LLP

(57) ABSTRACT

A method for managing multiple columns in a document. The method includes obtaining a text stream from the document; obtaining a current fill limit associated with an initial column of the multiple columns; placing, using a layout engine, the text stream within the multiple columns according to the current fill limit; identifying, after placing the text stream, a first fill level of a final column of the multiple columns; calculating a first difference between the current fill limit and the first fill level of the final column; calculating, in response to the first difference exceeding a tolerance, a revised fill limit based on the current fill limit; placing, using the layout engine, the text stream within the multiple columns according to the revised fill limit.

11 Claims, 9 Drawing Sheets

BALANCING MULTIPLE COLUMN LAYOUT

BACKGROUND

Although the demand for printing electronic documents (EDs) is decreasing because of recent improvements in computer displays, there are still those who generate hardcopies of EDs for purposes of reading the EDs. For example, some readers may simply prefer reading a hardcopy over staring at a computer screen. In other instances, hardcopies of the EDs may be provided to a group of people at an informal presentation, or in other situations where reading from a projector screen or computer display is not convenient.

An ED may specify one or more pages having a column layout. In other words, the ED may specify a text stream and/or images to be arranged in columns. The ED may dictate the columns have identical widths. Alternatively, the ED may dictate different widths for different columns. Regardless, it is the responsibility of a layout engine on a Page Rendering Device (PRD) or user machine to layout the text streams and images in the document as specified by the ED.

Accordingly, as the text stream may be of any size, as the columns may be specified with any set of dimensions, and as layout engines differ among platforms, it is unlikely that the text stream, once placed in the column format, will terminate at the height of the last column (i.e., it is unlikely the text stream will be evenly distributed among the columns of the final page) without the use of heavy time consuming processing. However, users often find it aesthetically pleasing to read from a document in which text is evenly distributed across the multiple columns and thus desire such a distribution if a column layout is present.

SUMMARY OF INVENTION

In general, in one aspect, the invention relates to a method for managing a plurality of columns in a document. The method comprises: obtaining a text stream from the document; obtaining a current fill limit associated with an initial column of the plurality of columns; placing, using a layout engine, the text stream within the plurality of columns according to the current fill limit; identifying, after placing the text stream, a first fill level of a final column of the plurality of columns; calculating a first difference between the current fill limit and the first fill level of the final column; calculating, in response to the first difference exceeding a tolerance, a revised fill limit based on the current fill limit; and placing, using the layout engine, the text stream within the plurality of columns according to the revised fill limit.

In general, in one aspect, the invention relates to a method for managing a plurality of columns in a document. The method comprises: obtaining a text stream from the document; identifying a total area of the plurality of columns; calculating an area covered by the text stream by placing, using a layout engine, the text stream within the plurality of columns; calculating a ratio by dividing the area covered with the total area; calculating a line limit based on a product of the ratio and a number of lines per column; and placing, using the layout engine, a first portion of the text stream in the initial column until the line limit is reached and a second portion of the text stream in the final column.

In general, in one aspect, the invention relates to a system for managing a plurality of columns in a document. The system comprises: a conversion module configured to generate an intermediate format of a document comprising a text stream and the plurality of columns; a layout engine configured to consume the intermediate format and place the text stream within the plurality of columns according to a current fill limit associated with an initial column of the plurality of columns; and a constraint calculation module (CCM) configured to: calculate a first difference between the current fill limit and a first fill level of the final column, wherein the first fill level results from placement of the text stream according to the current fill limit; and calculate, in response to the first difference exceeding a tolerance, a revised fill limit based on the current fill limit, wherein the layout engine is further configured to place the text stream within the plurality of columns according to the revised fill limit.

In general, in one aspect, the invention relates to a non-transitory computer readable storage medium storing instructions for managing a plurality of columns in a document. The instructions comprise functionality to: obtain a text stream from the document; obtain a current fill limit associated with an initial column of the plurality of columns; place, using a layout engine, the text stream within the plurality of columns according to the current fill limit; identify, after placing the text stream, a first fill level of a final column of the plurality of columns; calculate a first difference between the current fill limit and the first fill level of the final column; calculate, in response to the first difference exceeding a tolerance, a revised fill limit based on the current fill limit; and place, using the layout engine, the text stream within the plurality of columns according to the revised fill limit.

Other aspects of the invention will be apparent from the following description and the appended claims.

DETAILED DESCRIPTION

Figure 1:
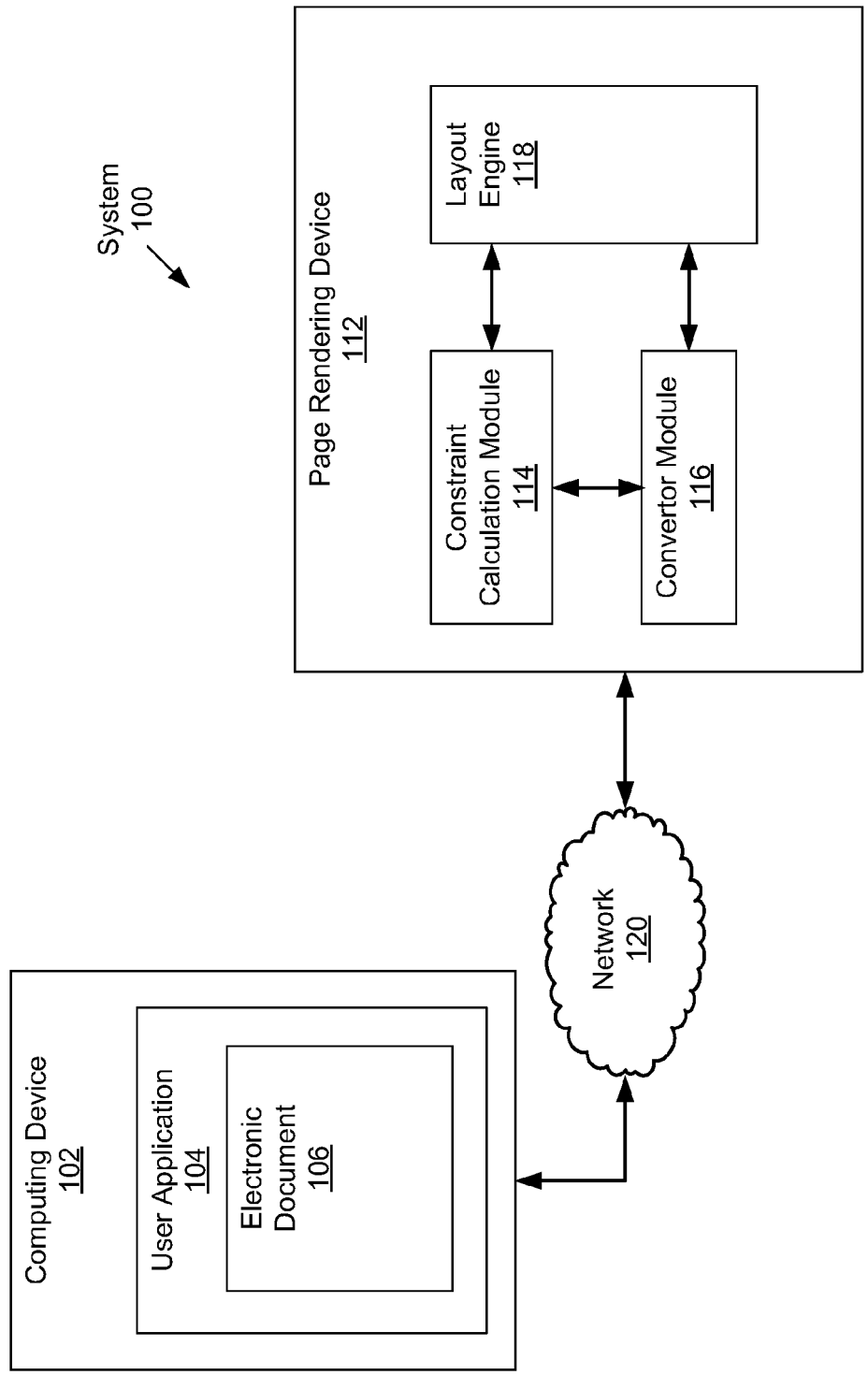
FIG. 1 shows a system in accordance in with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for evenly distributing a text stream among an initial column, a final column, and one or more intermediary columns on a page. The text stream is placed within the columns according to a fill limit. If a difference between the fill limit and a fill level of the final column exceeds a tolerance, the fill limit is revised and the text stream is placed within the columns according to the revised fill limit. The revised fill limit may be a function of the current fill limit and/or a previous fill limit.

In general, embodiments of the invention provide a system and method for evenly distributing a text stream among an initial column, a final column, and one or more intermediary columns on a page.

FIG. 1 shows a system (100) in accordance with one or more embodiments of the invention. As shown in FIG. 1, the system (100) has multiple components including a PRD (112) and a computing device (102). The PRD (112) may be a printer, an electronic reader, etc. The computing device (102) may be a personal computer (PC), a desktop computer, a mainframe, a server, a telephone, a kiosk, a cable box, a personal digital assistant (PDA), an electronic reader, a mobile phone, a smart phone, etc. There may be a direct connection (e.g., universal serial bus (USB) connection) between the computing device (102) and the PRD (112). Alternatively, the computing device (102) and the PRD (112) may be connected using a network (120) having wired and/or wireless segments.

In one or more embodiments of the invention, the PRD (112) is located on the computing device (102). In such embodiments, the PRD (112) may correspond to any combination of hardware and software on the computing device (102) for rendering an ED.

In one or more embodiments of the invention, the computing device (102) executes the user application (104). The user application (104) is a software application operated by a user and configured to obtain, input, generate, and/or print an electronic document (ED) (e.g., Electronic Document (106)) having any number of pages. Accordingly, the user application (104) may be a word-processing application, a spreadsheet application, a desktop publishing application, a graphics application, a photograph printing application, an Internet browser, etc. The user application (104) may generate new EDs and/or obtain previously saved EDs.

In one or more embodiments of the invention, the ED (106) includes columns with text. The column layout may apply to all pages of the ED (106). Alternatively, the column layout may apply to only a portion of the pages (i.e., a section of the ED (106)). In addition to the text stream, the ED (106) may also include one or more images placed completely or partially within the columns.

In one or more embodiments of the invention, the ED (106) is represented/defined using a document markup language (e.g., ODF, OOXML, etc.). Accordingly, the properties of the text and columns (i.e., font sizes, font styles, column heights, column widths, number of columns, margins, etc.) in the ED (106) may be recorded as attributes within the tags of the document markup language. Moreover, these properties/attributes are needed to correctly render the ED (106) for display or printing.

In one or more embodiments of the invention, the PRD (112) includes a layout engine (118). The layout engine (118) is configured to calculate the positions/placement of the columns, paragraphs, sentences, words, letters, images, etc. of the ED (106) on a conceptual page (e.g., paper, transparencies, microfilm, region on a computer monitor displaying a page image, e-book reader, etc.) subject to various constraints (discussed below). For example, the layout engine (118) may be configured to partition a text stream into multiple portions in order to fill multiple columns. Accordingly, the layout engine (118) is configured to render the ED (106) for viewing and/or printing. (112).

In one or more embodiments of the invention, the PRD (112) includes a convertor module (116). The convertor module (116) is configured to transform (i.e., convert) the ED (106) into an intermediate form suitable for consumption by the layout engine (118). Further, the convertor module (116) may introduce additional constraints (i.e., constraints in addition to the attributes/properties of the ED (106)) for use in controlling the layout engine (118) during the placement of a text stream within the columns of the ED (106) (discussed below).

Figure 2:
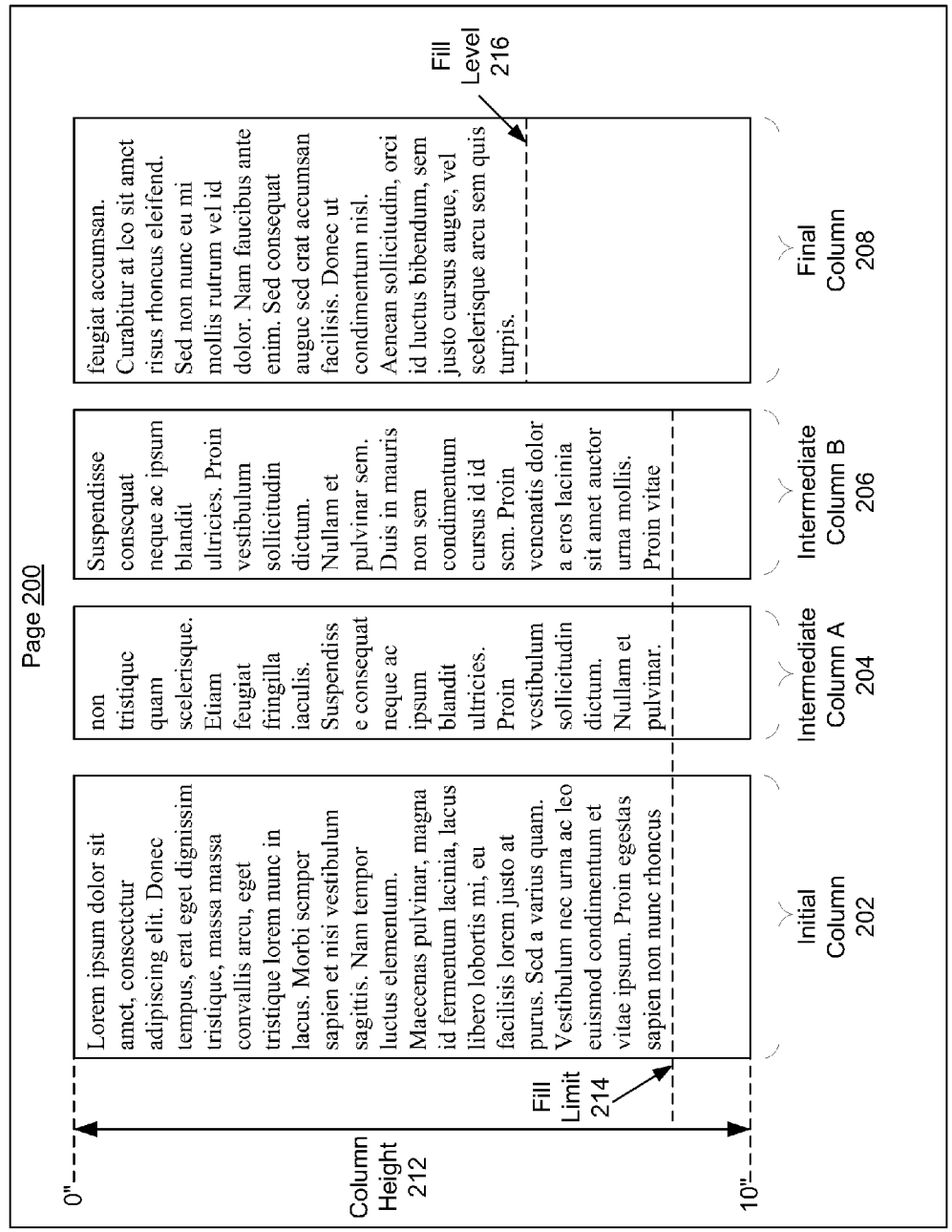
FIG. 2 and FIG. 3 show pages having multiple columns in accordance in one or more embodiments of the invention.

FIG. 2 shows a rendered page (200) of the ED (106) in accordance with one or more embodiments of the invention. As shown in FIG. 2, the rendered page (200) includes multiple columns (i.e., Initial Column (202), Intermediate Column A (204), Intermediate Column B (206), Final Column (208)) and a text stream placed within the multiple columns. As shown in FIG. 2, the columns (202, 204, 206, 208) are of different widths. As discussed above, the properties of the text stream and the columns (i.e., font sizes, font styles, column heights, column widths, number of columns, column positions, etc.) are defined in the ED (106). As also discussed above, the rendered page (200) is the output of the layout engine (118).

In one or more embodiments of the invention, the fill limit (214) is an additional constraint introduced by the convertor module (116). Specifically, the fill limit (214) restricts the level to which the initial column (202) and the intermediate columns (204, 206) can be filled with text. In other words, unless the fill limit (214) is set to the height of the column (212) (e.g., 10 inches), the layout engine (118) will begin placing a first portion of the text stream in the initial column (202) until the fill limit (214) is reached, then begin placing a second portion of the text stream in the intermediate column A (204) until the fill limit (214) is reached, then begin placing a third portion of the text stream in the intermediate column B (206) until the fill limit (214) is reached, and then place any remaining portion of the text stream in the final column (208). Accordingly, segments in the initial column (202) and the intermediate columns (204, 206) are deliberately left void of text.

In one or more embodiments of the invention, the fill level (216) corresponds to the level in the final column (208) where the last character of the text stream is placed. Thus, the fill level can only be identified after the layout engine (118) has rendered the page (200). Further, the fill level (216) will vary for different values of the fill limit (214). Those skilled in the art, having the benefit of this detailed description, will appreciate that having the fill level (216) approximately equaling the fill limit (214) (e.g., within a tolerance of 0.25 inches) corresponds to an even distribution of the text stream among the plurality of columns. Accordingly, in order to achieve the even distribution, it may be necessary for the layout engine (118) to render the ED (106) multiple times and to supply the layout engine (118) with a different fill limit for each iteration until the even distribution is achieved.

Figure 3:
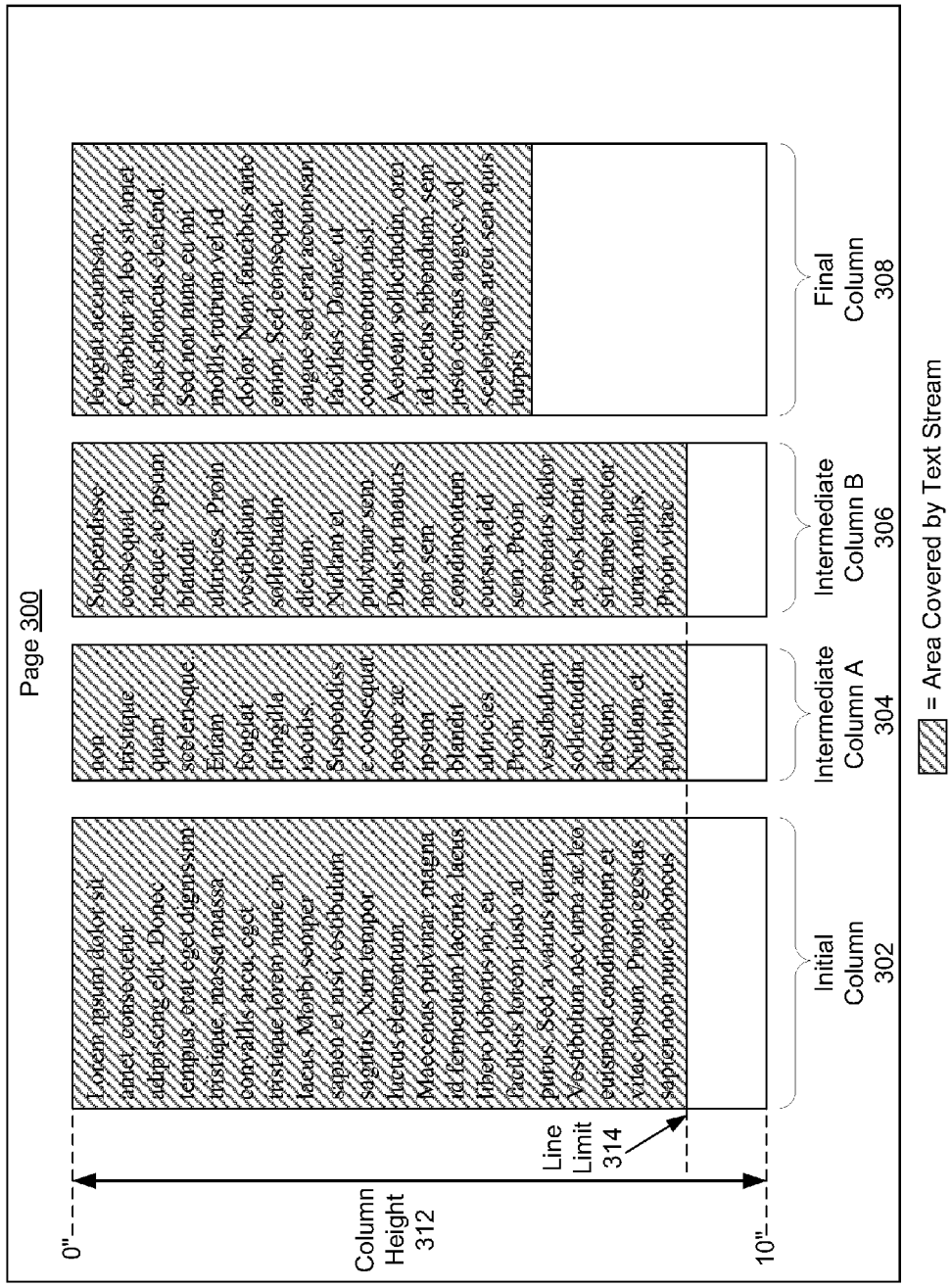

FIG. 3 shows a rendered page (300) of the ED (106) in accordance with one or more embodiments of the invention. As shown in FIG. 3, the rendered page (300) includes multiple columns (i.e., Initial Column (302), Intermediate Column A (304), Intermediate Column B (306), Final Column (308)) and a text stream placed within the multiple columns. As discussed above, the properties of the text stream and the columns (i.e., font sizes, font styles, column heights, column widths, number of columns, column positions, etc.) are defined in the ED (106). As also discussed above, the rendered page (300) is the output of the layout engine (118).

In one or more embodiments of the invention, the line limit (314) is an additional constraint introduced by the convertor module (116). Specifically, the line limit (314) restricts the number of lines of text that can be placed in the initial column (302) and the intermediate columns (304, 306). In other words, the layout engine (118) will begin placing a first portion of the text stream in the initial column (302) until the line limit (314) is reached, then begin placing a second portion of the text stream in the intermediate column A (304) until the line limit (314) is reached, then begin placing a third portion of the text stream in the intermediate column B (306) until the line limit (314) is reached, and then place any remaining portion of the text stream in the final column (308). Accordingly, segments in the initial column (302) and the intermediate columns (304, 306) are deliberately left void of text.

In one or more embodiments of the invention, the number of lines that can be placed in a column (302, 304, 306, 308) depends on the font style and font size of the text stream. Accordingly, the number of lines that can be placed in a column may only be determined during an initial rendering of the page (300) by the layout engine (118). Those skilled in the art, having the benefit of this detailed description, will appreciate that by selecting the proper line limit (314), the last line of text placed in the final column (308) will equal (or approximately equal) the line limit. In other words, by selecting the proper line limit (314), there will be an even distribution of the text stream among the plurality of columns. Accordingly, in order to achieve the even distribution, it may be necessary for the layout engine (118) to render the ED (106) at least twice and to supply the layout engine (118) with a line limit for the second iteration so that an even distribution of the text stream is achieved. (112).

Referring back to FIG. 1, in one or more embodiments of the invention, the PRD (112) includes a constraint calculation module (CCM) (114) configured to calculate one or more constraints to be supplied to the layout engine (118). Accordingly, the CCM (114) is configured to calculate the fill limit (discussed below). Similarly, the CCM (114) is configured to calculate the line limit (discussed below). In one or more embodiments of the invention, the CCM (114) is configured to track and record all previous/current fill limits, fill levels, line limits, areas covered, number of lines per page, tolerances, etc.

Figure 4:
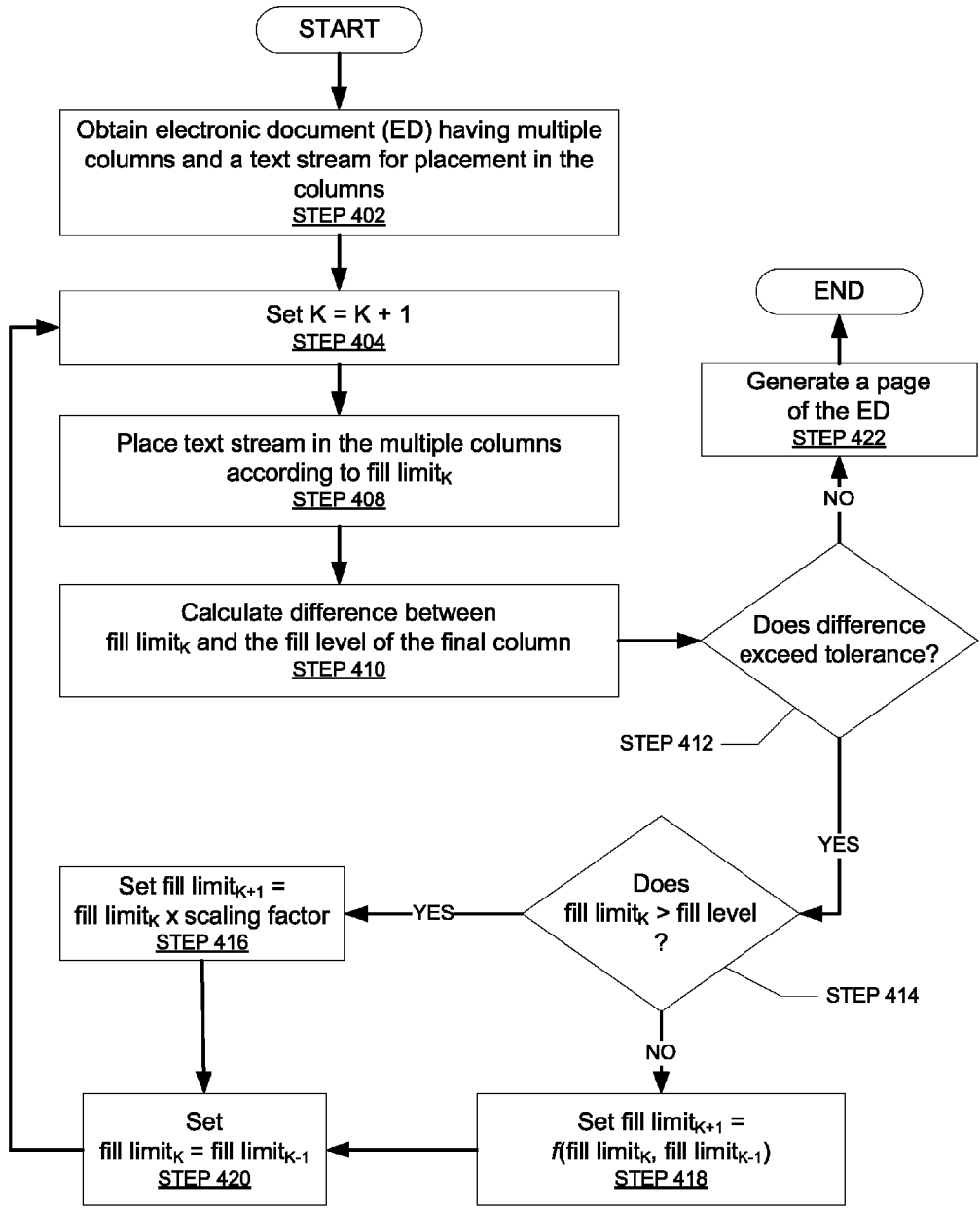
FIG. 4 and FIG. 5 show flowcharts in accordance with one or more embodiments of the invention.

FIG. 4 shows a flowchart in accordance with one or more embodiments of the invention. The process depicted in FIG. 4 may be implemented using the system (100), described above in reference to FIG. 1. One or more steps shown in FIG. 4 may be omitted, repeated, and/or performed in a different order among different embodiments of the invention. Accordingly, embodiments of the invention should not be considered limited to the specific number and arrangement of steps shown in FIG. 4.

Initially, an ED is obtained (STEP 402). As discussed above, the ED includes columns with text. The column layout may apply to all pages of the ED. Alternatively, the column layout may apply to only a portion of the pages (i.e., a section of the ED). In one or more embodiments of the invention, the ED is represented/defined using a document markup language (e.g., ODF, OOXML, etc.). Accordingly, the properties of the text and columns (i.e., font sizes, font styles, column heights, column widths, number of columns, margins, etc.) in the ED may be recorded as attributes within the tags of the document markup language.

In STEP 404, the counter K is incremented by one. The counter K may first be initialized to K=0 if STEP 404 is being executed immediately after STEP 402.

In STEP 408, the text stream of the ED in placed into the columns of the ED according to the fill limit$_K$ (i.e., the current fill limit). In other words, a first portion of the text stream is placed (e.g., by the layout engine (118), discussed above in reference to FIG. 1) in the initial column of the ED until the current fill limit is reached. Then, a second portion of the text stream is placed in an intermediate column of the ED until current fill limit is reached, etc. This continues until all intermediate column have been filled. Then, the remaining portion of the text stream is placed in the final column of the ED. In one or more embodiments of the invention, the fill limit$_1$ is set to the column height of the initial column. The column height may be stored as an attribute/property within the ED.

In STEP 410, the difference between the fill limit$_K$ and the fill level of the final column is calculated. As discussed above, the fill level corresponds to the level in the final column where the last character of the text stream is placed. As also discussed above, the fill level can only be identified after the text stream has been placed within the columns (i.e., after STEP 408). In one or more embodiments of the invention, when the final column has no text (i.e., the entire text stream was successfully placed within the initial column and one or more intermediary columns), the fill level is set to zero.

In STEP 412, it is determined whether the calculated difference exceeds a tolerance. As discussed above, when the fill level (approximately) equals the fill limit$_K$, there is an even distribution of the text stream among the multiple of columns of the ED. Accordingly, when it is determined that the fill level is within a tolerance of the fill limit$_K$, a page of the ED may be generated (STEP 422). The page includes the text stream placed within the multiple columns according to the fill limit$_K$. No further iterations are necessary and the process ends. However, when it is determined that the calculated difference exceeds the tolerance, the process proceeds to STEP 414.

In STEP 414, it is determined whether the fill limit$_K$ exceeds the fill level. When it is determined that the fill limit$_K$ exceeds the fill level, the process proceeds to STEP 416. Otherwise, when it is determined that the fill limit$_K$ does not exceed the fill level, the process proceeds to STEP 418.

In STEP 416, fill limit$_{K+1}$ (i.e., the revised fill limit) is calculated. Specifically, fill limit$_{K+1}$ is calculated (e.g., by the CCM (114), discussed above in reference to FIG. 1) by multiplying the current fill limit by a predetermined scaling factor. In other words, fill limit$_{K+1}$=fill limit$_K$×scaling factor. In one or more embodiments of the invention, the scaling factor is 0.5. In one or more embodiments of the invention, the scaling factor is 0.7. Those skilled in the art, having the benefit of this detailed description, will appreciate that the scaling factor may be any value between zero and one exclusive (i.e., 0<scaling factor<1).

Alternatively, fill limit$_{K+1}$ is calculated in STEP 418. Specifically, the revised fill limit (i.e., fill limit$_{K+1}$) may be set to the arithmetic mean or geometric mean of fill limit$_K$ (i.e., the current fill limit) and fill limit$_{K-1}$ (i.e., the previous fill limit). In one or more embodiments of the invention, fill limit$_0$ is zero. As yet another alternative, fill limit$_{K+1}$ may be set to any linear function of the current fill limit and the previous fill limit (i.e., fill limit$_{K+1}$=f(fill limit$_K$, fill limit$_{K-1}$)).

In STEP 420, the fill limit$_K$ is set to fill limit$_K$=fill limit$_{K-1}$, and the process returns to STEP 404 for another iteration.

In one or more embodiments of the invention, once a predetermined number of iterations (e.g., 10) of the process in FIG. 4 have been executed, the process proceeds to STEP 422 regardless of the difference between the current fill limit and the fill level. In one or more embodiments of the invention, the steps of FIG. 4 are only required for the last page of the ED having the columns.

Figure 5:
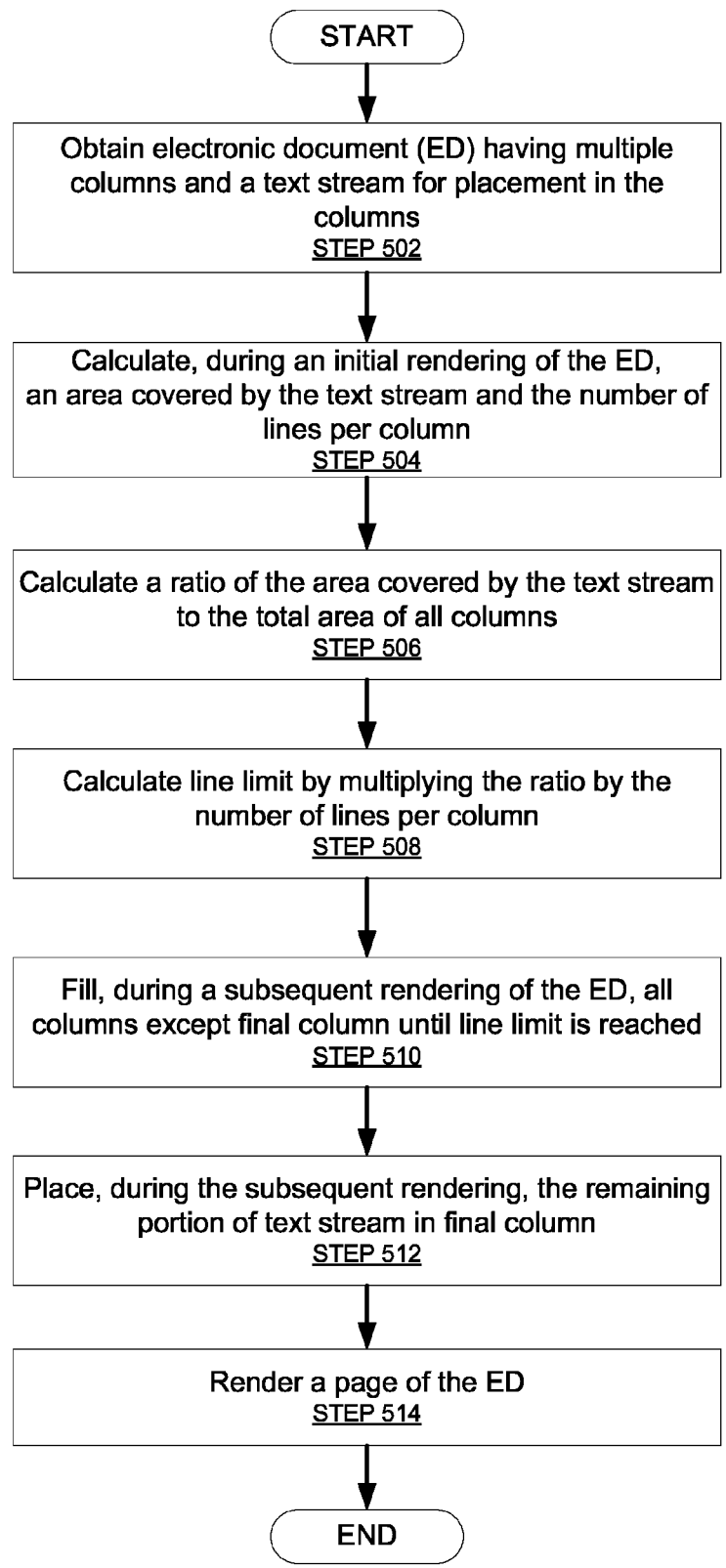

FIG. 5 shows a flowchart in accordance with one or more embodiments of the invention. The process depicted in FIG. 5 may be implemented using the system (100), described above in reference to FIG. 1. One or more steps shown in FIG. 5 may be omitted, repeated, and/or performed in a different order among different embodiments of the invention. Accordingly, embodiments of the invention should not be considered limited to the specific number and arrangement of steps shown in FIG. 5.

Initially, an ED is obtained (STEP 502). As discussed above, the ED includes columns with text. The column layout may apply to all pages of the ED. Alternatively, the column layout may apply to only a portion of the pages (i.e., a section of the ED). In one or more embodiments of the invention, the ED is represented/defined using a document markup language (e.g., ODF, OOXML, etc.). Accordingly, the properties of the text and columns (i.e., font sizes, font styles, column heights, column widths, number of columns, margins, etc.) in the ED may be recorded as attributes within the tags of the document markup language.

In STEP 504, an initial rendering of the ED is performed (e.g., by the layout engine (118), discussed above in reference to FIG. 1) and both the area covered by the text stream and the number of lines per page are calculated. During the initial rendering of the ED, the line limit is ignored and/or set to the column height of the initial column. As discussed above, the number of lines that can be placed in a column and the area covered by the text depends on the font style and font size of the text stream. Accordingly, the number of lines that can be placed in a column and the area covered by the text may be determined by rendering ED.

In STEP 506, a ratio of the area covered by the text stream to the total area of all columns on a page of the ED is calculated (e.g., by the CCM (114), discussed above in reference to FIG. 1). In other words, ratio=(area covered by the text stream)/(total area of columns on the page). The dimensions of each column may be specified within the tags of the ED. The total area of the columns on the page is calculated from the dimensions.

In STEP 508, a line limit is calculated by multiplying the ratio (STEP 506) by the calculated number of lines per column (STEP 504). In STEP 510, during a subsequent rendering of the ED, all columns except the final column are filled until the line limit is reached. In other words, during the subsequent rendering of the ED, a first portion of the text stream is placed in the initial column (302) until the line limit is reached, then a second portion of the text stream in the intermediate column until the line limit is reached, etc. This continues until all intermediate columns have been filled. Then, the remaining portion of the text stream is placed in the final column of the ED (STEP 512).

As discussed above, by selecting the proper line limit, the last line of text placed in the final column will equal (or approximately equal) the line limit. In other words, by selecting the proper line limit, there will be an even distribution of the text stream among the multiple columns. A page of the ED can then be rendered (STEP 514). The page includes the text stream placed within the multiple columns according to the line limit.

Figure 6A:
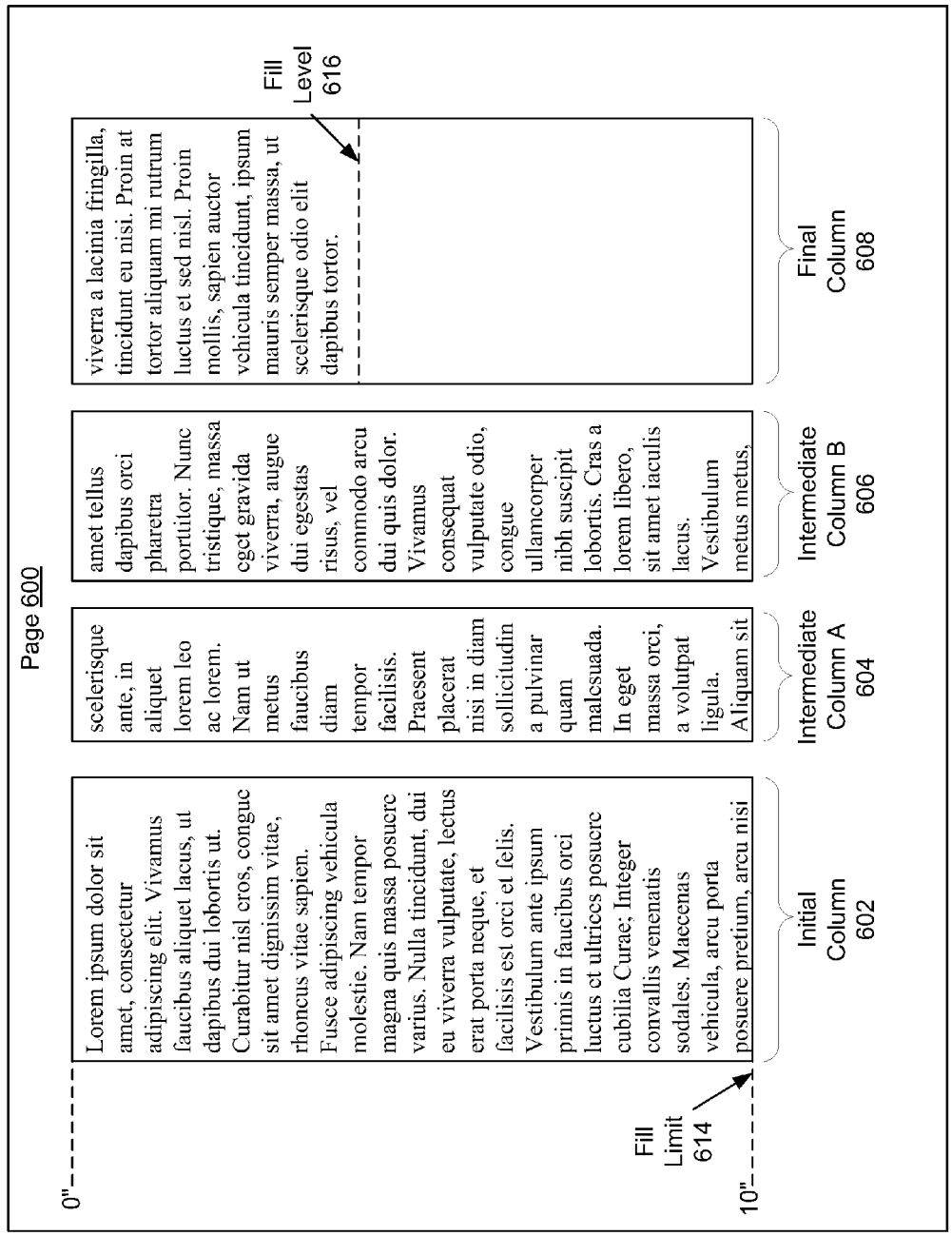
FIGS. 6A-6C show examples in accordance with one or more embodiments of the invention.
Figure 6B:
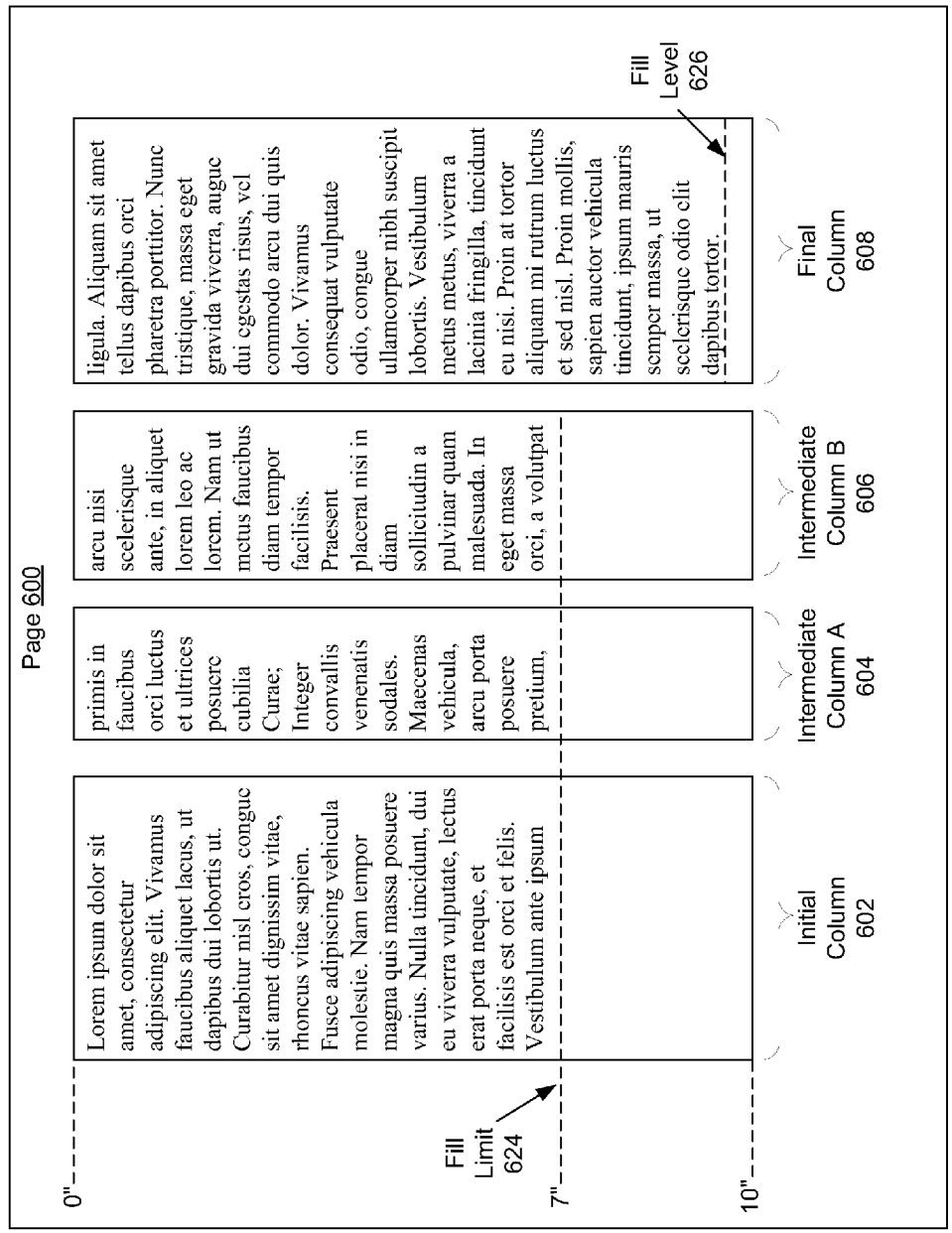
Figure 6C:
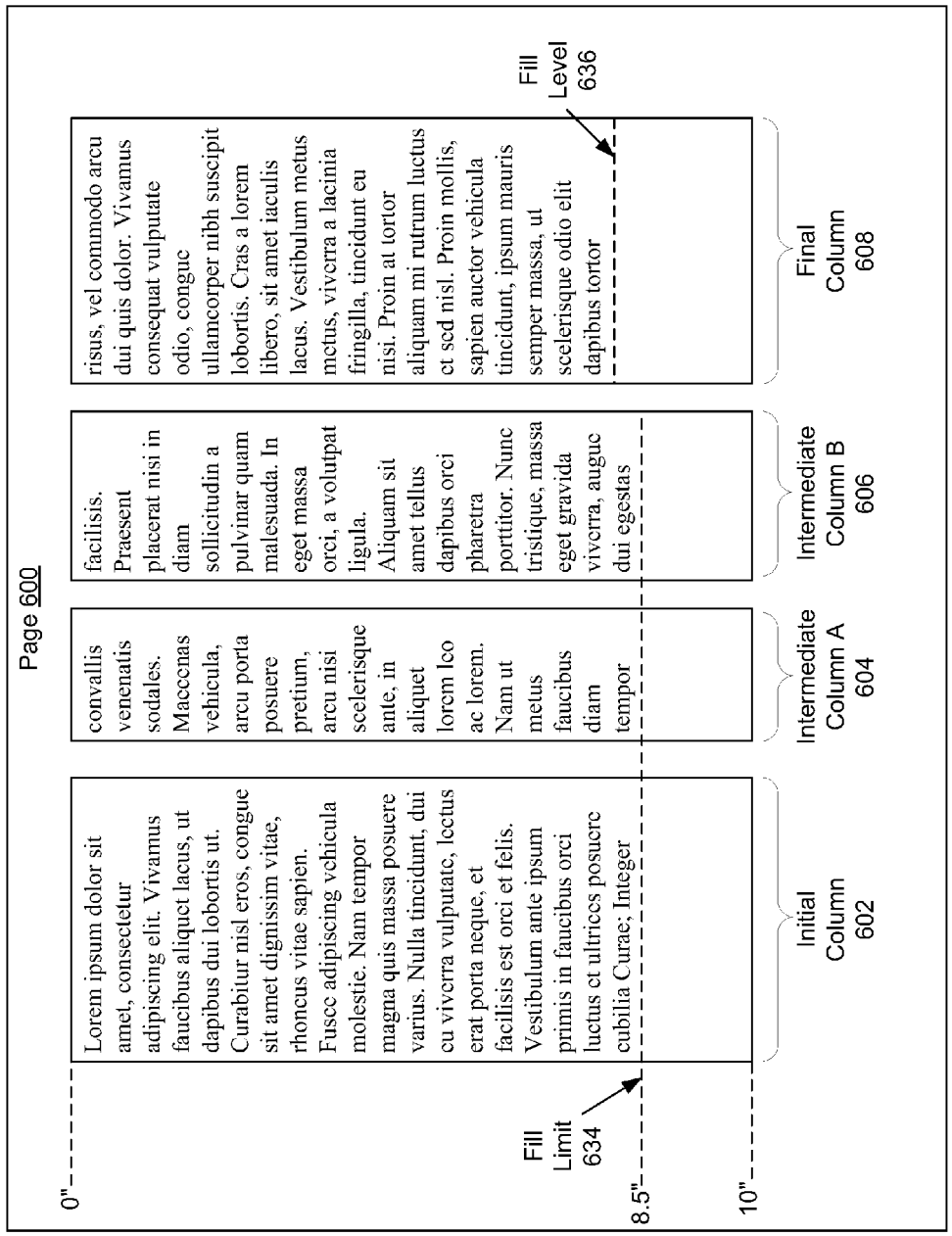

FIGS. 6A, 6B, and 6C show an example in accordance with one or more embodiments of the invention. Specifically, FIG. 6A shows a rendered page (600) having an initial column (602), an intermediate column A (604), an intermediate column B (606), and a final column (608). The page (600) is part of an ED defined using a markup language and having a text stream for placement in a column format. Further, the page (600) corresponds to the final page of the ED having a column layout.

During the rendering of the page (600), the fill limit (614) was set to the column height (i.e., 10 inches). Accordingly, a first portion of the text stream was placed in the initial column (602) until the fill limit (614) was reached, then a second portion of the text stream was placed in the intermediate column A (604) until the fill limit (614) was reached, then a third portion of the text stream was placed in the intermediate column B (606) until the fill limit (614) was reached, and then the remaining portion of the text stream was placed in the final column (608). As shown in FIG. 6A, the fill level (616) corresponds to the level in the final column (608) where the last character of the text stream is placed.

There is a significant difference between the fill limit (614) of FIG. 6A and the fill level (616) of FIG. 6A (i.e., the difference exceeds a predefined threshold). Further, as also seen in FIG. 6A, the fill limit (614) exceeds the fill level (616).

FIG. 6B shows the page (600) following a subsequent rendering. During the subsequent rendering of the page (600), the fill limit (624) was set to the product of the previous fill limit (i.e., fill limit (614) of FIG. 6A) and a scaling factor (i.e., 0.7). In other words, the fill limit $(624)=10"\times 0.7=7"$. Accordingly, during the subsequent rendering of the page (600), a first portion of the text stream was placed in the initial column (602) until the fill limit (624) was reached, then a second portion of the text stream was placed in the intermediate column A (604) until the fill limit (624) was reached, then a third portion of the text stream was placed in the intermediate column B (606) until the fill limit (624) was reached, and then the remaining portion of the text stream was placed in the final column (608). As shown in FIG. 6B, the fill level (626) corresponds to the level in the final column (608) where the last character of the text stream is placed.

There remains a significant difference between the fill limit (624) of FIG. 6B and the fill level (626) of FIG. 6B (i.e., the difference exceeds a predefined threshold). Further, as also seen in FIG. 6B the fill level (626) exceeds the fill limit (624).

FIG. 6C shows the page (600) following a subsequent rendering. During the subsequent rendering of the page (600), the fill limit (634) was set to the arithmetic mean of the fill limit (614) of FIG. 6A the fill limit (624) of FIG. B. In other words, the fill limit $(634)=0.5\times(10"+7")=8.5"$. Accordingly, during the subsequent rendering of the page (600), a first portion of the text stream was placed in the initial column (602) until the fill limit (634) was reached, then a second portion of the text stream was placed in the intermediate column A (604) until the fill limit (634) was reached, then a third portion of the text stream was placed in the intermediate column B (606) until the fill limit (634) was reached, and then the remaining portion of the text stream was placed in the final column (608). As shown in FIG. 6C, the fill level (636) corresponds to the level in the final column (608) where the last character of the text stream is placed.

The difference between the fill limit (634) of FIG. 6C and the fill level (636) of FIG. 6C is within a predefined tolerance. Accordingly, the text stream is considered evenly distributed among the multiple columns (602, 604, 606, 608). Accordingly, a page having the text stream placed within the columns according to the fill limit (634) can be generated.

Embodiments of the invention have one or more of the following advantages: the ability to evenly distribute a text stream using a binary approach (i.e., using the current and previous fill limits); the ability to evenly distribute a text stream within multiple columns based on an area covered by the text and the number of lines per column; the ability to define even distribution of a text stream across multiple columns using a tolerance, etc.

Figure 7:
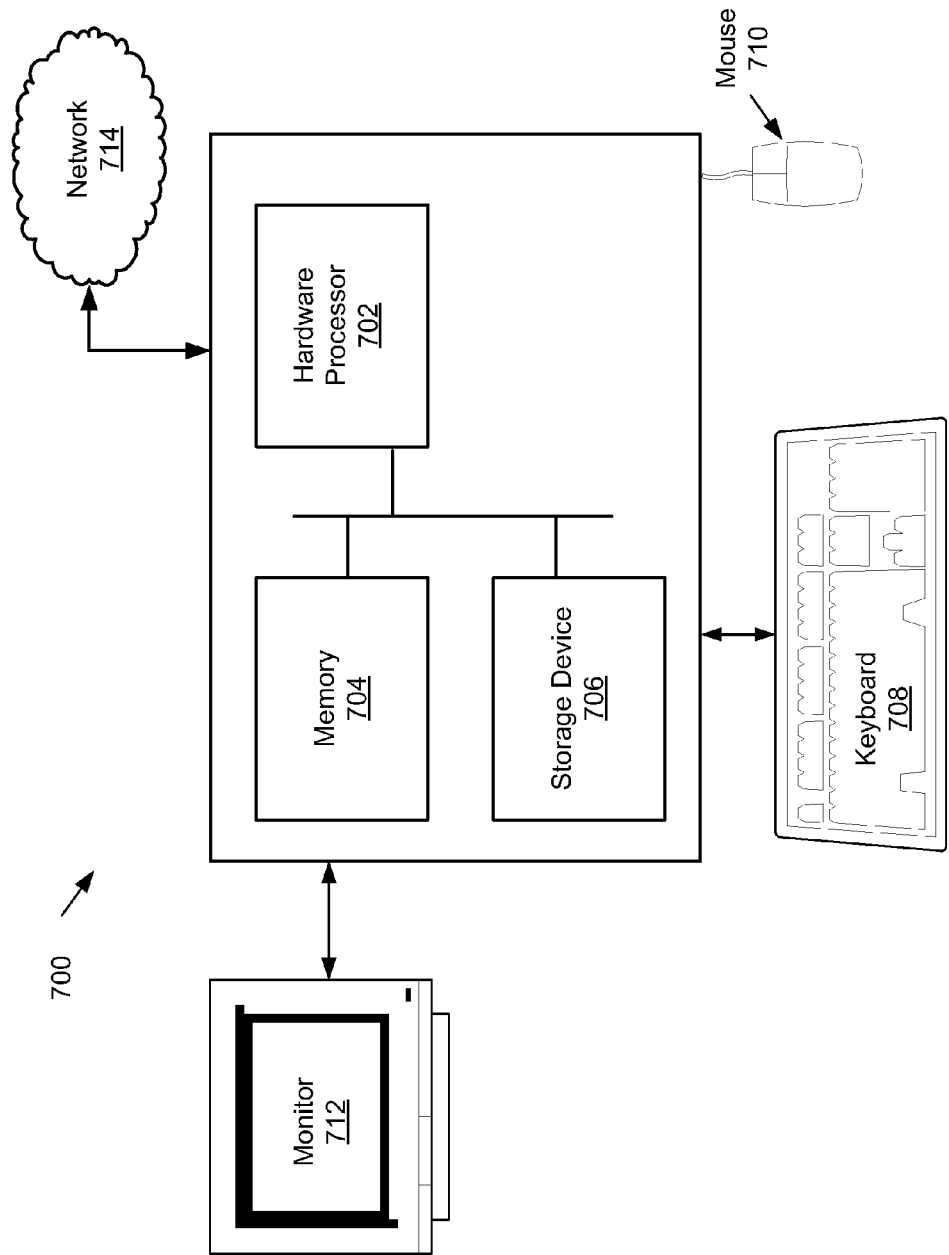
FIG. 7 shows a computer system in accordance with one or more embodiments of the invention.

Embodiments of the invention may be implemented on virtually any type of computer regardless of the platform being used. For example, as shown in FIG. 7, a computer system (700) includes one or more processor(s) (702) (such as a central processing unit (CPU), integrated circuit, etc.), associated memory (704) (e.g., random access memory (RAM), cache memory, flash memory, etc.), a storage device (706) (e.g., a hard disk, an optical drive such as a compact disk drive or digital video disk (DVD) drive, a flash memory stick, etc.), and numerous other elements and functionalities typical of today's computers (not shown). The computer system (700) may also include input means, such as a keyboard (708), a mouse (710), or a microphone (not shown). Further, the computer system (700) may include output means, such as a monitor (712) (e.g., a liquid crystal display (LCD), a plasma display, or cathode ray tube (CRT) monitor). The computer system (700) may be connected to a network (714) (e.g., a local area network (LAN), a wide area network (WAN), the Internet, or any other type of network) via a network interface connection (not shown). Those skilled in the art will appreciate that many different types of computer systems exist, and the aforementioned input and output means may take other forms. Generally speaking, the computer system (700) includes at least the minimal processing, input, and/or output means necessary to practice embodiments of the invention.

Further, in one or more embodiments of the invention, one or more elements of the aforementioned computer system (700) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a tangible computer readable storage medium, such as a compact disc (CD), a diskette, a tape, a hard drive, punch cards, memory, or any other tangible computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing a plurality of columns including an initial column and a final column in an electronic document (ED) described in a markup language, comprising:
   obtaining a text stream from the ED;
   identifying, based on a plurality of attributes in the markup language, a plurality of widths of the plurality of columns, a height of the plurality of columns, and the number of columns in the plurality of columns, wherein each of the plurality of columns has the height and one of the plurality of widths;
   identifying a total area of the plurality of columns based on the plurality of widths and the height;
   calculating an area covered by the text stream by placing, using a layout engine, the text stream within the plurality of columns;
   calculating a ratio by dividing the area covered with the total area;
   calculating a line limit based on a product of the ratio and a number of lines per column; and
   replacing, using the layout engine, a first portion of the text stream in the initial column until the line limit is reached and a second portion of the text stream in the final column.

2. A method for managing a plurality of columns including an initial column and a final column in an electronic document (ED) described in a markup language, comprising:
   obtaining a text stream from the ED;
   identifying, based on a plurality of attributes in the markup language describing the ED, a plurality of widths of the plurality of columns, a height of the plurality of columns, and the number of columns in the plurality of columns, wherein each of the plurality of columns has the height and one of the plurality of widths;
   setting a first fill limit associated with the initial column of the plurality of columns to the height of the initial column;
   placing, using a layout engine, the text stream within the plurality of columns according to the first fill limit;
   identifying, after placing the text stream, a first fill level of the final column of the plurality of columns, wherein the first fill limit exceeds the first fill level;
   calculating a first difference between the first fill limit and the first fill level of the final column;
   calculating, in response to the first difference exceeding a tolerance and the first fill limit exceeding the first fill level, a second fill limit by multiplying the first fill limit by a scaling factor;
   replacing, using the layout engine, the text stream within the plurality of columns according to the second fill limit;
   identifying, after replacing the text stream, a second fill level, wherein the second fill level exceeds the second fill limit;
   calculating a second difference between the second fill limit and the second fill level of the final column;
   calculating, in response to the second difference exceeding the tolerance and the second fill level exceeding the second fill limit, a third fill limit by averaging the second fill limit and the first fill limit; and
   replacing, using the layout engine, the text stream within the plurality of columns according to the third fill limit.

3. The method of claim 2, further comprising:
   identifying, after replacing the text stream according to the third fill limit, a third fill level of the final column;
   calculating a third difference between the third fill limit and the third fill level of the final column; and
   generating, in response to the third difference being within the tolerance, a page of the ED comprising the plurality of columns and the text stream placed within the plurality of columns according to the third fill limit.

4. The method of claim 2, wherein the scaling factor is 0.5.

5. The method of claim 2, wherein placing the text stream according to the first fill limit comprises:
   filling the initial column until the first fill limit is reached with a first portion of the text stream;
   filling an intermediary column of the plurality of columns until the first fill limit is reached with a second portion of the text stream; and
   filling the final column with a third portion of the text stream.

6. A non-transitory computer readable storage medium storing instructions for managing a plurality of columns including an initial column and a final column in an electronic document (ED) described in a markup language, the instructions comprising functionality to:
   obtain a text stream from the ED;

identify, based on a plurality of attributes in the markup language describing the ED, a plurality of widths of the plurality of columns, a height of the plurality of columns, and the number of columns in the plurality of columns, wherein each of the plurality of columns has the height and one of the plurality of widths;

set a first fill limit associated with an initial column of the plurality of columns to the height of the initial column;

place, using a layout engine, the text stream within the plurality of columns according to the first fill limit;

identify, after placing the text stream, a first fill level of a final column of the plurality of columns, wherein the first fill limit exceeds the first fill level;

calculate a first difference between the first fill limit and the first fill level of the final column;

calculate, in response to the first difference exceeding a tolerance and the first fill limit exceeding the first fill level, a second fill limit by multiplying the first fill limit by a scaling factor;

replace, using the layout engine, the text stream within the plurality of columns according to the second fill limit;

identify, after replacing the text stream, a second fill level of the final column, wherein the second fill level exceeds the second fill limit;

calculate a second difference between the second fill level and the second fill limit;

calculate, in response to the second difference exceeding the tolerance and the second fill level exceeding the second fill limit, a third fill limit by averaging the second fill limit and the first fill limit; and replace, using the layout engine, the text stream within the plurality of columns according to the third fill limit.

7. The non-transitory computer readable storage medium of claim 6, the instructions further comprising functionality to:

identify, after replacing the text stream according to the third fill limit, a third fill level of the final column;

calculate a third difference between the third fill limit and the third fill level of the final column; and generate, in response to the third difference being within the tolerance, a page of the ED comprising the plurality of columns and the text stream placed within the plurality of columns according to the third fill limit.

8. The non-transitory computer readable storage medium of claim 6, wherein the scaling factor is 0.5.

9. A system for managing a plurality of columns including an initial column and a final column in an electronic document (ED) described in a markup language, comprising:

a processor;

a convertor module configured to:

identify, based on a plurality of attributes in the markup language, a plurality of widths of the plurality of columns, a height of the plurality of columns, and the number of columns in the plurality of columns, wherein each of the plurality of columns has the height and one of the plurality of widths; and set a first fill limit associated with an initial column of the plurality of columns to the height of the initial column;

a layout engine executing on the processor and configured to:

place the text stream within the plurality of columns according to the first fill limit;

replace the text stream within the plurality of columns according to a second fill limit; and replace the text stream within the plurality of columns according to a third fill limit; and a constraint calculation module (CCM) configured to:

calculate a first difference between the first fill limit and a first fill level of a final column of the plurality of columns, wherein the first fill level results from placement of the text stream according to the first fill limit;

calculate, in response to the first difference exceeding a tolerance and the first fill limit exceeding the first fill level, a second fill limit by multiplying the first fill limit by a scaling factor;

calculate a second difference between the second fill limit and a second fill level of the final column, wherein the second fill level results from replacement of the text stream according to the second fill limit; and calculate, in response to the second difference exceeding the tolerance and the second fill level exceeding the second fill limit, the third fill limit by averaging the second fill limit and the first fill limit.

10. The system of claim 9, wherein the conversion module, the layout engine, and the CCM are located on a page rendering device (PRD) configured to:

generate, in response to a third difference between the third fill limit and a third fill level being within the tolerance, a page of the ED comprising the plurality of columns and the text stream placed within the plurality of columns according to the third fill limit, wherein the third fill level results from replacement of the text stream according to the third fill limit.

11. The system of claim 9, wherein the scaling factor is 0.5.

* * * * *